H. H. WAIT.
MAGNETIC SHIELD FOR ELECTRIC MACHINES.
APPLICATION FILED FEB. 11, 1907.
996,381.
Patented June 27, 1911.
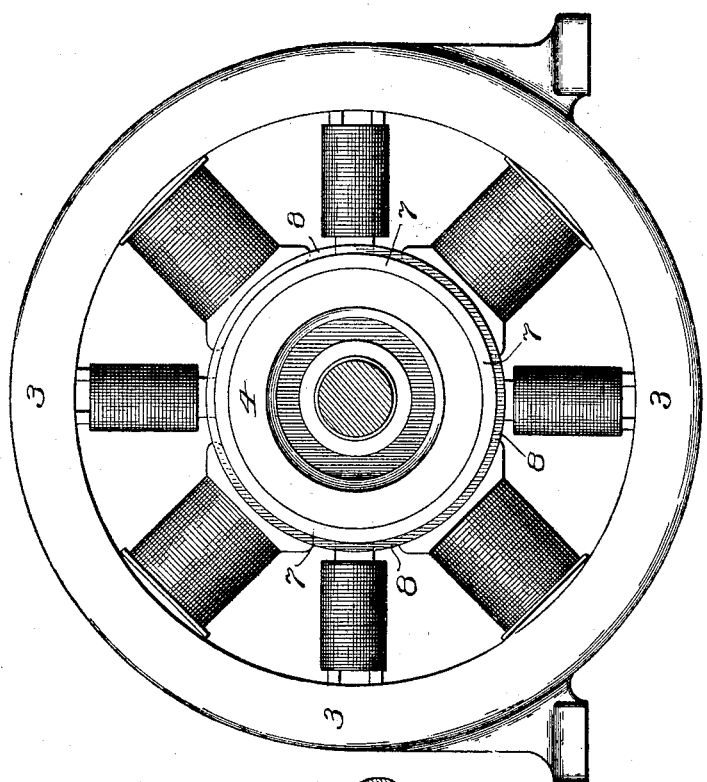
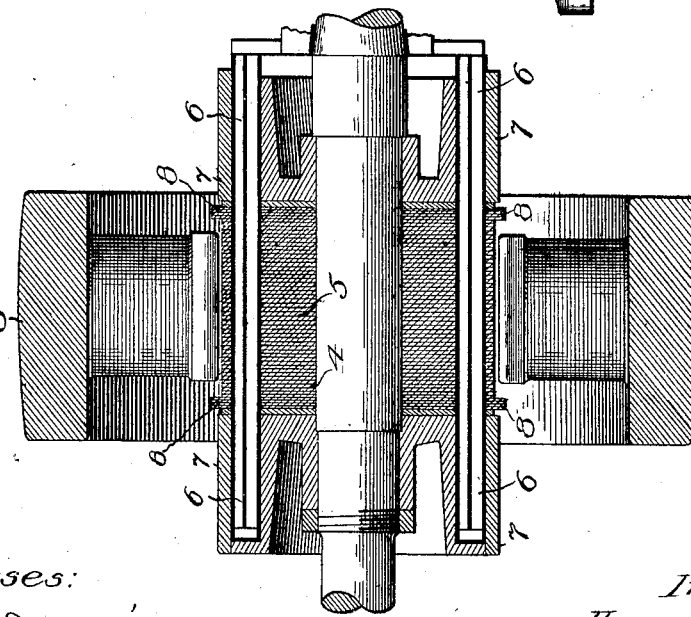
Witnesses:
Inventor:
Henry H. Wait,
By Barton, Tanner & Folk,
Attys.

UNITED STATES PATENT OFFICE.

HENRY H. WAIT, OF CHICAGO, ILLINOIS.

MAGNETIC SHIELD FOR ELECTRIC MACHINES.

996,381.  Specification of Letters Patent.  Patented June 27, 1911.

Application filed February 11, 1907. Serial No. 356,730.

*To all whom it may concern:*

Be it known that I, HENRY H. WAIT, a citizen of the United States, residing at Chicago, in the county of Cook and State of Illinois, have invented a certain new and useful Improvement in Magnetic Shields for Electric Machines, of which the following is a full, clear, concise, and exact description.

My invention relates to electrical machines, such as generators and motors, whether of the alternating-current or direct-current type, and will be especially useful in its application to high-speed generators, such as those which are direct-driven by steam turbines.

The object is, in general, to prevent the injurious effects of leakage of magnetic flux from the field magnet pole to the end-portions of the armature which are not intended to carry such flux. In high-speed generators, for instance, it is desirable to provide metal retaining-bands around the end-portions of the rotor, to confine and sustain the end-connections of the winding against centrifugal force; but it is found in practice that these retaining-bands become very hot from the effect of eddy currents which are set up in the retaining-bands by the action of the stray magnetic field leaking out from the magnet pole.

In accordance with my invention, a body of magnetic material, such as a ring of iron, is interposed between the edge of the magnet pole and the end portion of the armature, and acts to shield said end portion from the leakage flux.

In the accompanying drawing, Figure 1 is a cross-sectional elevation of a turbo-generator of the direct-current type, equipped with the magnetic shield of my invention; and Fig. 2 is an end view thereof.

The same letters of reference indicate the same parts in both views.

The generator shown consists of a stationary four-pole field magnet 3 (said magnet having commutating poles located between the four main poles) and an armature 4 arranged to rotate within the field of said magnet. The armature consists of a laminated iron core 5 and a winding composed of conductors 6 embedded in the slots in the periphery of the core. The conductors necessarily extend some little distance beyond the ends of the laminated core, to provide for end-connections and commutator-leads; and metal retaining bands are provided around the ends of the armature, to confine and sustain such end-connections, against centrifugal force. Between the lateral edges of the magnet poles and the inner edges of the metal retaining bands 7 I provide rings 8 of magnetic material which act to divert through themselves the most of the stray magnetic flux which would otherwise tend to escape into the retaining bands and set up eddy currents therein. The rings 8 thus act as shields to effectively screen the ends of the armature from the leakage flux.

In the form shown in the drawings the magnetic shields 8 revolve with the armature, and in fact are composed simply of groups of iron laminations at the ends of the core, somewhat larger in diameter than the laminations of the main body of the core. It will be evident, however, that my invention can be applied in other forms and to other types of electrical machines than the particular embodiment shown in the drawing.

I claim:

1. In an electrical machine, the combination with a stationary magnetic element, of a rotor having end portions extending beyond the edge of said stationary element, retaining bands of metal upon the projecting ends of said rotor, and circumferential bodies of magnetic material carried by said rotor and projecting beyond the surface thereof between said stationary magnetic element and each of said retaining bands, and acting continuously to shield said metal bands from the leakage flux from said stationary magnetic element, whereby the heating of said bands is prevented.

2. In an electrical machine, the combination with a magnet pole and a rotor arranged to revolve adjacent to said pole, said rotor having an end portion extending beyond the edge of said magnet pole, and a circumferential shield of magnetic material upon the periphery of said rotor, between the projecting end portion thereof and the edge of the magnet pole, said shield projecting radially beyond the cylindrical surface of said rotor and acting to shield said end portion from the leakage flux from said pole.

3. In an electric machine, the combination with a stationary magnet pole, of an armature revolving in front of said pole, said armature having metal retaining-bands upon its projecting ends beyond the lateral edges of said pole, and circumferential rings of magnetic material carried by said armature and projecting beyond the surface thereof between the edges of the magnet pole and each of said retaining-bands, said rings acting to shield said bands from the leakage flux.

4. In an electric generator, the combination with a field magnet system and an armature, of a special circuit of magnetic material carried by said armature and projecting beyond the surface thereof between the field magnet system and each end of the armature, and shunting the end-connections of the armature, whereby the leakage flux from the field magnet system is diverted from harmful paths.

5. In a dynamo electric machine, an armature, end-connections on said armature, laminated iron shields carried by said armature and projecting beyond the surface thereof between the central or active portion of the armature and each of the ends thereof, said shields projecting between the edges of the magnet poles of said machine and said end connections whereby the magnetic leakage is practically diverted from its path through said end-connections.

In witness whereof, I hereunto subscribe my name this 8th day of February A. D., 1907.

HENRY H. WAIT.

Witnesses:
A. H. MOORE,
D. C. TANNER.

---

Copies of this patent may be obtained for five cents each, by addressing the "Commissioner of Patents, Washington, D. C."